(12) United States Patent
Benko et al.

(10) Patent No.: US 10,788,897 B1
(45) Date of Patent: Sep. 29, 2020

(54) SYSTEMS AND METHODS FOR SENSING GESTURES VIA VIBRATION-SENSITIVE WEARABLES DONNED BY USERS OF ARTIFICIAL REALITY SYSTEMS

(71) Applicant: Facebook Technologies, LLC, Menlo Park, CA (US)

(72) Inventors: Hrvoje Benko, Seattle, WA (US); Wolf Kienzle, Seattle, WA (US); Neil Weiss, Seattle, WA (US); Yu-Te Wang, Seattle, WA (US); Yanjun Ma, Seattle, WA (US); David R. Perek, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 5 days.

(21) Appl. No.: 16/247,933

(22) Filed: Jan. 15, 2019

(51) Int. Cl.
*G09G 5/00* (2006.01)
*G06F 3/01* (2006.01)
*G06N 3/08* (2006.01)
*G06N 20/00* (2019.01)
*G06F 3/0346* (2013.01)

(52) U.S. Cl.
CPC .............. *G06F 3/017* (2013.01); *G06F 3/011* (2013.01); *G06F 3/0346* (2013.01); *G06N 3/08* (2013.01); *G06N 20/00* (2019.01)

(58) Field of Classification Search
CPC ... G09G 3/36; G09G 3/30; G09G 5/00; G06F 3/041; G06F 3/045; G06F 3/043; G06F 3/042; G06F 3/038
See application file for complete search history.

(56) References Cited

U.S. PATENT DOCUMENTS

| | | | |
|---|---|---|---|
| 9,858,799 B1 * | 1/2018 | DeLuca | A61B 5/02438 |
| 2015/0370326 A1 * | 12/2015 | Chapeskie | G06F 3/017 345/156 |
| 2016/0328021 A1 * | 11/2016 | Lee | G06F 3/011 |
| 2018/0165854 A1 * | 6/2018 | Du | G06F 3/01 |

* cited by examiner

*Primary Examiner* — Pegeman Karimi
(74) *Attorney, Agent, or Firm* — FisherBroyles, LLP

(57) ABSTRACT

A system for vibration-driven sensing may include a wearable dimensioned to be donned by a user of an artificial reality system. The system may also include a vibration sensor that is incorporated into the wearable and generates an electrical response that corresponds to a vibration detected at the wearable. The system may further include at least one processing device communicatively coupled to the vibration sensor. The processing device may determine, based at least in part on the electrical response generated by the vibration sensor, that the user has made a specific gesture with at least one body part. In response to this determination, the processing device may generate an input command for the artificial reality system based at least in part on the specific gesture made by the user. Various other systems and methods are also disclosed.

20 Claims, 9 Drawing Sheets

SYSTEMS AND METHODS FOR SENSING GESTURES VIA VIBRATION-SENSITIVE WEARABLES DONNED BY USERS OF ARTIFICIAL REALITY SYSTEMS

BACKGROUND

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation one or more of the same. Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate interpersonal interactions and collaboration from across the globe.

Traditional artificial reality systems may incorporate hands-on controllers that enable users to enter input capable of modifying their artificial reality experiences. Unfortunately, these hands-on controllers may limit the users' mobility and/or movements, especially hand-based actions and/or gestures. To resolve these limitations, some artificial reality systems may incorporate traditional wearables capable of sensing a few motions and/or gestures made by users. The sensing of some motions and/or gestures, however, has proved challenging and/or impracticable via such traditional wearables.

The instant disclosure, therefore, identifies and addresses a need for additional systems and methods for sensing gestures via vibration-sensitive wearables donned by users of artificial reality systems.

SUMMARY

As will be described in greater detail below, the instant disclosure generally relates to systems and methods for sensing gestures via vibration-sensitive wearables donned by users of artificial reality systems. In some embodiments, a system may include a wearable dimensioned to be donned by a user of an artificial reality system. The system may also include a vibration sensor that is incorporated into the wearable and generates an electrical response that is commensurate with a vibration detected at the wearable. The system may further include at least one processing device communicatively coupled to the vibration sensor. The processing device may determine, based at least in part on the electrical response generated by the vibration sensor, that the user has made a specific gesture with at least one body part. In response to this determination, the processing device may generate an input command for the artificial reality system based at least in part on the specific gesture made by the user.

In some examples, the processing device may process the electrical response via a machine learning model. In such examples, the processing device may detect a pattern indicative of the specific gesture within the electrical response via the machine learning model. The processing device may then determine, based at least in part on the pattern detected via the machine learning model, that the user has made the specific gesture with the body part.

In some examples, the processing device may be incorporated into the wearable. In other examples, the processing device may be incorporated into a head-mounted display that is communicatively coupled to the wearable.

In some examples, the system may additionally include a storage device that is incorporated into the wearable and stores the machine learning model. In one example, the machine learning model may include a convolutional neural network or a recurrent neural network.

In some examples, the processing device may capture one or more samples of electrical responses generated by the vibration sensor in response to the user performing the specific gesture. In such examples, the processing device may calibrate the machine learning model to recognize the specific gesture as performed by the user.

In some examples, the wearable may include and/or represent a wristband dimensioned to be donned on a wrist of the user. In some examples, the processing device may measure the electrical response generated by the vibration sensor and then determine that the measurement of the electrical response is indicative of the specific gesture made by the user. Examples of such gestures include, without limitation, a tapping together of an index finger of the user and a thumb of the user, a tapping together of a middle finger of the user and a thumb of the user, a hand gesture, a wrist twist, a physical touching of the body part to another body part, a physical touching of the body part to an inanimate object, combinations or variations of one or more of the same, and/or any other suitable gesture.

In some examples, the vibration sensor may generate the electrical response by measuring an amount of acceleration caused by the vibration. In such examples, the vibration sensor may be positioned proximate to a skin surface of the user within the wearable. In this instance, the vibration may have propagated from the body part to the wearable via the body of the user.

In some examples, the system may additionally include a transmitter that is incorporated into the wearable and/or a head-mounted display dimensioned to be donned on the head of the user. In such examples, the processing device may be incorporated into the wearable and send the input command for the artificial reality system to the head-mounted display via the transmitter. In one example, the input command may cause the head-mounted display to account for the specific gesture made by the user. In addition, the vibration sensor may have an output data rate of at least 200 hertz.

In some examples, the electrical response generated by the vibration sensor may be commensurate with the vibration detected at the wearable. Additionally or alternatively, the processing device may facilitate modifying at least one virtual component of the artificial reality system to account for the specific gesture made by the user.

A corresponding wearable may include a fastener dimensioned to facilitate securing the wearable to a user of an artificial reality system. The wearable may also include a vibration sensor that generates an electrical response that corresponds to a vibration detected at the wearable. The wearable may further include at least one processing device communicatively coupled to the vibration sensor. The processing device may determine, based at least in part on the electrical response generated by the vibration sensor, that the user has made a specific gesture with at least one body part. In response to this determination, the processing device may generate an input command for the artificial reality system based at least in part on the specific gesture made by the user.

A corresponding method may include (1) detecting, by a vibration sensor incorporated into a wearable donned by a user of an artificial reality system, a vibration that arrived at the wearable via a body of the user, (2) generating, by the vibration sensor, an electrical response that corresponds to the vibration that arrived at the wearable via the body of the user, (3) determining, based at least in part on the electrical response generated by the vibration sensor, that the user has made a specific gesture with at least one body part, and then in response to determining that the user has made a specific gesture with the body part, (4) generating an input command for the artificial reality system based at least in part on the specific gesture made by the user.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

Figure 1:
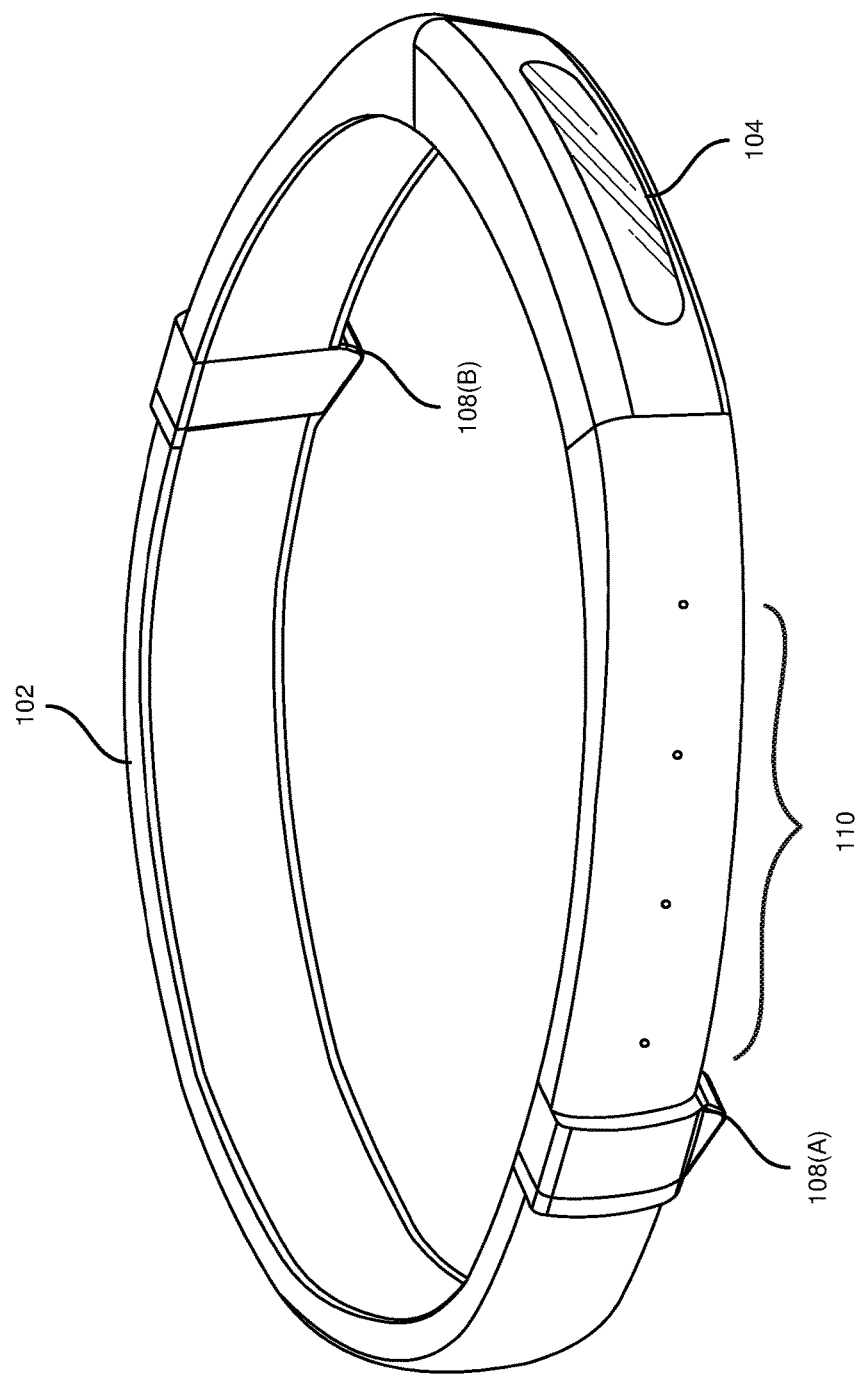
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for sensing gestures via vibration-sensitive wearables donned by users of artificial reality systems. As will be explained in greater detail below, embodiments of the present disclosure may enable users of artificial reality systems to provide hands-free user input that modifies their artificial reality experiences. For example, a wristband donned by a user may include a high-speed vibration sensor whose output data is used to detect and/or identify gestures made by the user. In this example, the high-speed vibration sensor may generate and/or produce an electrical response that is commensurate with an amount of vibration and/or acceleration experienced by the wristband. The wristband may also include a processing device that monitors and/or measures the electrical response generated by the high-speed vibration sensor to facilitate sensing gestures made by the user.

In one example, the user may tap his or her thumb and index finger together. In this example, the vibration sensor may respond to the vibration and/or acceleration produced by the user tapping his or her thumb and index finger together. Accordingly, the output(s) of the vibration sensor may reflect and/or indicate that the user has tapped his or her thumb and index finger together. The processing device may measure the electrical response and then determine that the electrical response indicates that the user has tapped his or her thumb and index finger together. The processing device may then cause the artificial reality system to modify the artificial reality experience presented to the user in response to determining that the user has tapped his or her thumb and index finger together in this way.

Figure 2:
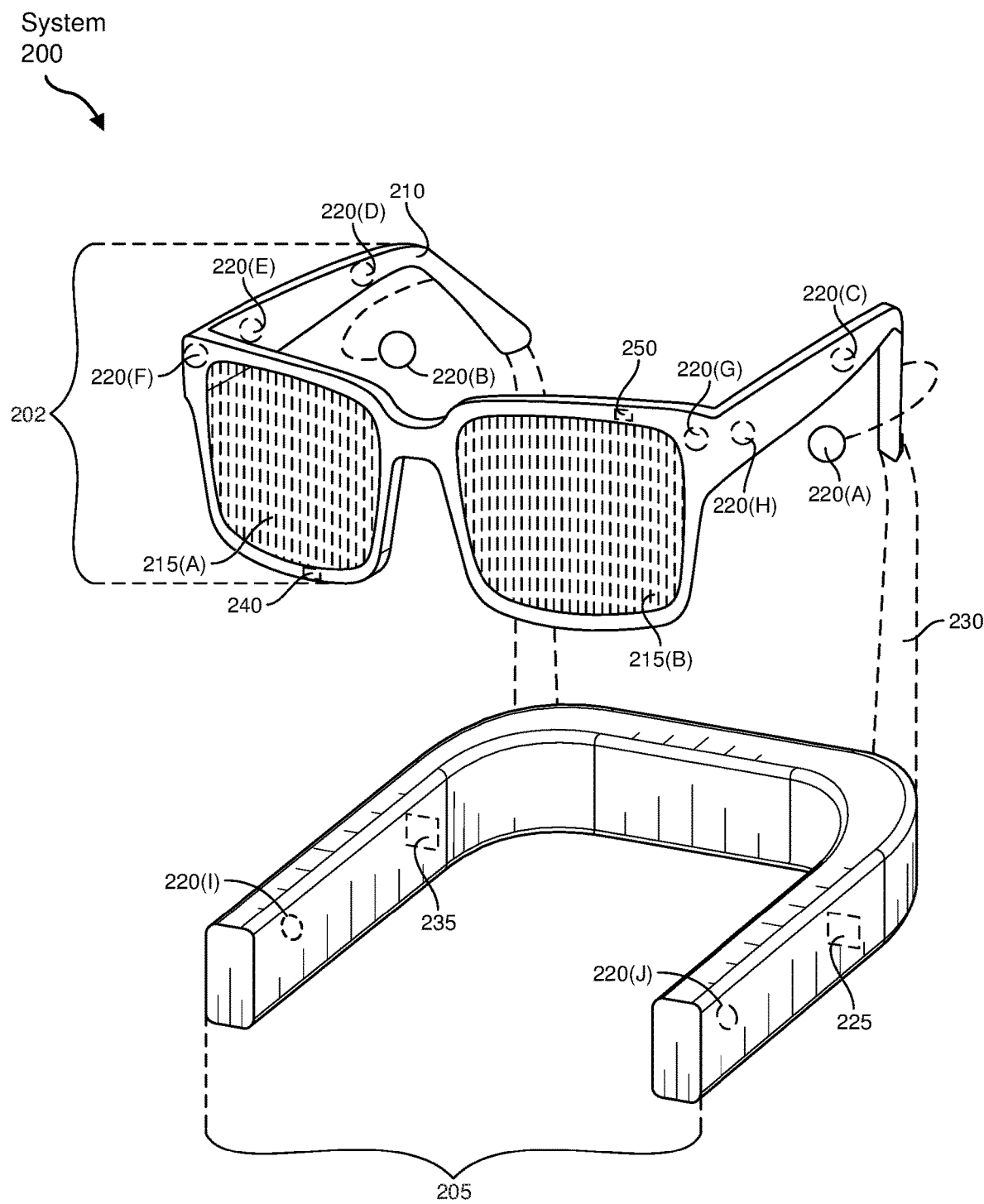
FIG. 2 illustrates an embodiment of an augmented reality headset and a corresponding neckband.
Figure 3:
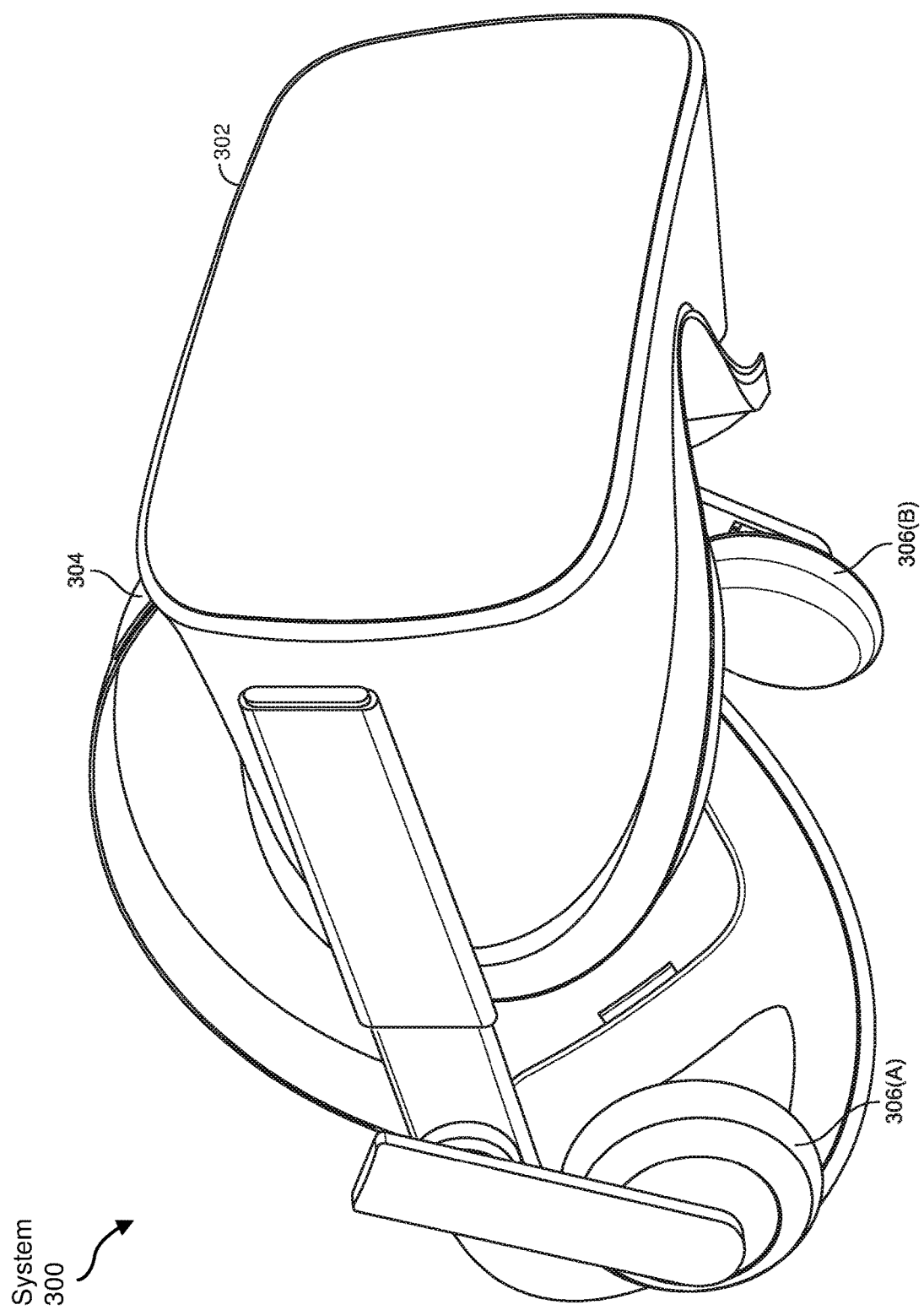
FIG. 3 illustrates an embodiment of a virtual reality headset.

The following will provide, with reference to FIGS. 1-3, detailed descriptions of various types of exemplary artificial reality devices that may facilitate and/or contribute to a user's artificial reality experience. Detailed descriptions of exemplary systems that implement and/or facilitate vibration-driven sensing via wearables will be described in connection with FIGS. 4-7 and 9. Detailed descriptions of an exemplary electrical response generated by a high-speed vibration sensor incorporated into a wearable will be described in connection with FIG. 8. In addition, the discussion corresponding to FIG. 9 will provide detailed descriptions of an exemplary method for sensing physical contact via vibration-sensitive wearables donned by users of artificial reality systems.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, AR system 100 may include a frame 102 and a camera assembly 104 that is coupled to frame 102 and configured to gather information about a local environment by observing the local environment. AR system 100 may also include one or more audio devices, such as output audio transducers 108(A) and 108 (B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between neckband acoustic sensors 220(I) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

The artificial reality devices described above in connection with FIGS. 1-3 may facilitate and/or contribute to artificial reality experiences for users donning wearables that implement vibration-based sensing. As will be described in greater detail below in connection with FIGS. 4-9, such vibration-based sensing may provide users with a dynamic hands-free mechanism for detecting physical contact and/or specific gestures made by the users.

Figure 4:
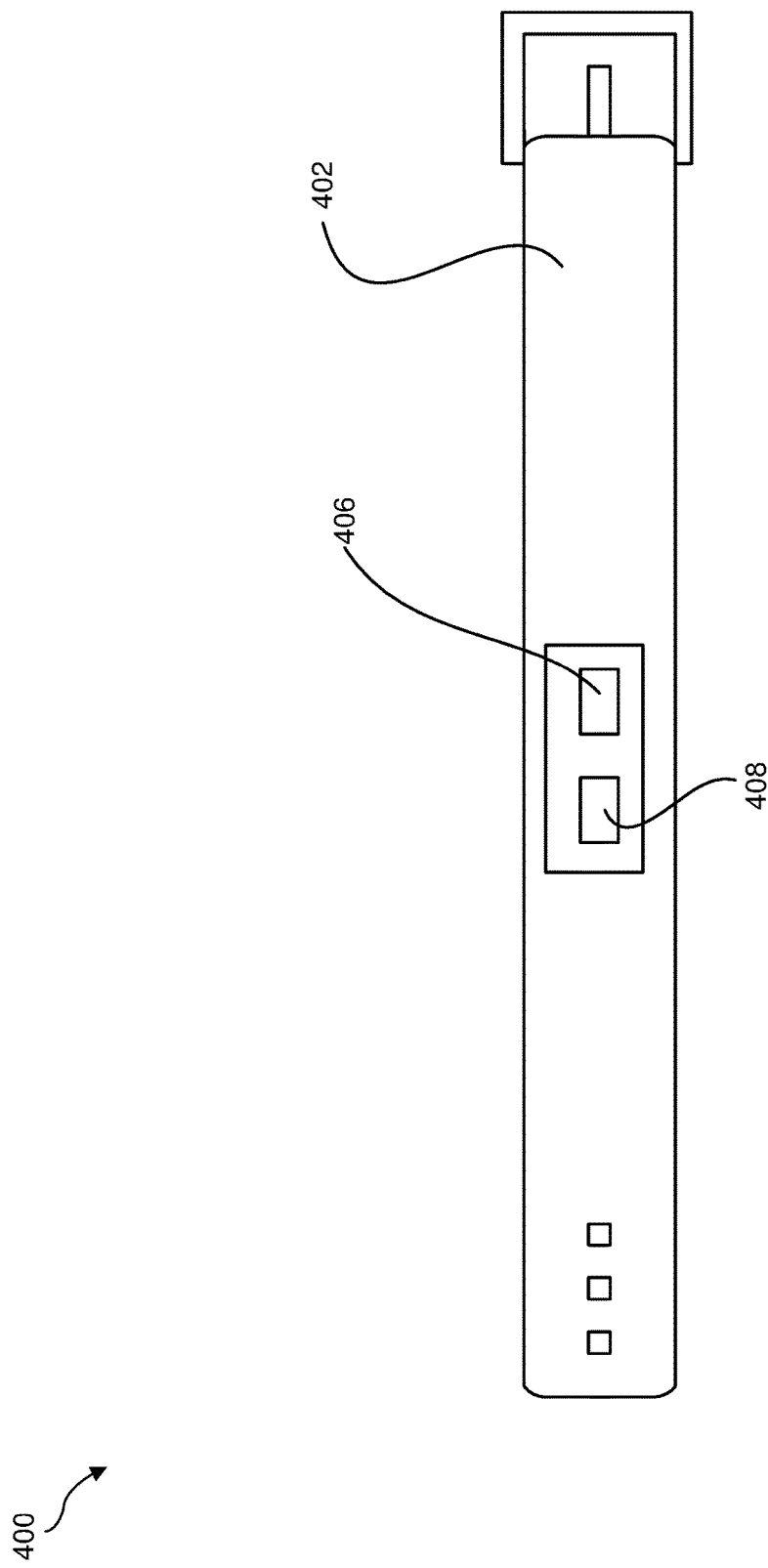
FIG. 4 illustrates an exemplary wearable that facilitates vibration-driven sensing of gestures made by users of artificial reality systems.

FIG. 4 is a block diagram of an exemplary wearable 400 that facilitates vibration-based sensing when donned by a user of an artificial reality system. As illustrated in this figure, exemplary wearable 400 may include a vibration sensor 406, a processing device 408, and a wristband 402. In one example, wearable 400 may be dimensioned to be donned and/or worn by a user of an artificial reality system. For example, the user may fasten wearable to his or her wrist via wristband 402. The term "wearable," as used herein, generally refers to any type or form of computing device that is worn by a user as part of an article of clothing, an accessory, and/or an implant.

Vibration sensor 406 may include and/or represent an electrical device and/or instrument that measures and/or is sensitive to vibrations. In some examples, vibration sensor 406 may detect, sense, and/or monitor vibrations experienced at the wrist of a user. In one example, vibration sensor 406 may include and/or represent an accelerometer that measures proper acceleration and/or generates an electrical response to the measured acceleration. Additionally or alternatively, vibration sensor 406 may sense vibrations and/or changes in movement along multiple axes and/or detect the magnitude and/or direction of such vibrations and/or changes in movement. Vibration sensor 406 may also sense orientations and/or shocks.

Vibration sensor 406 may implement a variety of different technologies, devices, and/or structures to achieve vibration-based and/or accelerative sensing. In some examples, vibration sensor 406 may include and/or represent a MicroElectroMechanical System (MEMS) that incorporates small, somewhat movable parts. Such a MEMS-based vibration sensor may include a variety of different materials, such as silicon, polymers, metals and/or ceramics.

Examples of vibration sensor 406 include, without limitation, accelerometers, gyroscopes, IMUs, microphones (such as contact microphones), pressure sensors, laser displacement sensors, eddy current sensors, capacitive displacement sensor, velocity sensor, micromachined capacitive vibration sensors, piezoelectric resistive vibration sensors, capacitive spring vibration sensors, electromechanical servo vibration sensors, high-gravity vibration sensors, laser-based vibration sensors, magnetic induction vibration sensors, optical vibration sensors, strain gauge vibration sensors, combinations or variations of one or more of the same, and/or any other suitable types of vibration sensor.

In some examples, the electrical response generated by vibration sensor 406 may include and/or represent multiple signals, multiple outputs, multiple channels, and/or multi-directional data. For example, vibration sensor 406 may measure acceleration along an x-axis, a y-axis, and/or a z-axis simultaneously. Vibration sensor 406 may then generate signals and/or data representative of those measurements along the x-axis, the y-axis, and/or the z-axis. In one example, vibration sensor 406 may output those signals and/or data to processing device 408 via multiple analog channels that correspond to those axes. In another example, vibration sensor 406 may output those signals and/or data to processing device 408 via a serial communication bus, such as a Serial Peripheral Interface (SPI) bus and/or an Inter-Integrated Circuit ($I^2C$) bus. Additionally or alternatively, vibration sensor 406 may generate a binary signal that indicates whether a measured vibration and/or acceleration exceeds a certain threshold.

In some examples, vibration sensor 406 may need to achieve high enough speed and/or high enough resolution to detect specific gestures made by a user. To facilitate the detection of specific gestures made by the user, vibration sensor 406 may need to output data with enough frequency and/or sensitivity to identify certain vibrations at the user's wrist as being indicative of a specific gesture made by the user. For example, vibration sensor 406 may need to have an output data rate of at least 200 hertz to facilitate the accurate detection and/or identification of specific gestures. In another example, to fully capture the strongest portion of a signal and/or vibration with the minimum sampling rate, vibration sensor 406 may need to have an output data rate of approximately 800 hertz. In a further example, to fully capture the entire signal and/or vibration with the minimum sampling rate, vibration sensor 406 may need to have an output data rate of approximately 2,400 hertz. By outputting high-frequency and/or high-sensitivity data in this way, vibration sensor 406 may avoid the pitfalls of producing false positives and/or false negatives. Without the ability to output such high-frequency and/or high-sensitivity data, vibration sensor 406 may be unable to serve as a reliable instrument on which processing device 408 bases determinations of whether or not the user has made a specific gesture.

In some examples, vibration sensor 406 may need to measure and/or be sensitive to a certain range of gravitational acceleration. In one example, vibration sensor 406 may need to be able to measure a range of approximately $-3$ g to $+3$ g of gravitational acceleration to detect and/or differentiate specific gestures made by a user. For example, finger tapping may generate a peak gravitational acceleration of between 0.5 g and 1 g, and normal handwaving may generate a peak gravitational acceleration of between 2 g and 3 g.

Although not illustrated in this way in FIG. 4, wearable 400 may include multiple vibration sensors to improve the accuracy of gesture detection, disambiguation, and/or identification. For example, wearable 400 may be equipped with one vibration sensor that is rigidly mounted to wristband 402 to avoid contact with the user's skin. In this example, wearable 402 may also be equipped with another vibration sensor that is non-rigidly and/or flexibly mounted to wristband 402 in direct contact with the user's skin. By incorporating multiple vibration sensors in this way, wearable 400 may be able to use the output of one vibration sensor to remove some of the noise from the output of the other vibration sensor, thereby creating a more distilled representation of the user's gestures.

Processing device 408 may include and/or represent a hardware-implemented processing device capable of interpreting and/or executing computer-readable instructions. In one example, processing device 408 may be communicatively coupled to vibration sensor 406. Processing device 408 may obtain electrical signals and/or responses generated and/or outputted by vibration sensor 406. These electrical signals and/or responses may represent and/or be commensurate with the amount and/or direction of vibration and/or acceleration experienced and/or measured by vibration sensor 406 at any given time. Additionally or alternatively, these electrical signals and/or responses may be incommensurate with and/or disproportionate to amount and/or direction of vibration and/or acceleration experienced and/or measured by vibration sensory 406.

Additionally or alternatively, processing device 408 may obtain computer-readable data representative of the amount of vibration and/or acceleration experienced and/or measured by vibration sensor 406 at any given time. Either way, processing device 408 may analyze and/or process the measurements for evidence of vibrations. When wearable 400 is donned by a user of an artificial reality system, such evidence may indicate and/or be used to determine that the user has touched something and/or made a specific gesture. In response to determining that the user has touched something and/or made a specific gesture, processing device 408 may cause and/or direct the artificial reality system to modify the user's artificial reality experience to account for the touching and/or gesture.

Wristband 402 may include and/or represent a strap designed and/or dimensioned to at least partially encompass the wrist of a user of an artificial reality system. Wristband 402 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wristband 402 may be defined and/or formed in a variety of shapes and/or sizes with the aim of securing to the wrist of a user of an artificial reality system. In some examples, wristband 402 may be adjustable to provide a one-size-fits-most feature.

In addition to the various components illustrated in FIG. 4, exemplary wearable 400 may include one or more other components that are not illustrated and/or labelled in FIG. 4. For example, wearable 400 may include and/or incorporate batteries, electronic assemblies, communication interfaces or devices, and/or fasteners. A system for vibration-driven sensing may include and/or represent all or a portion of wearable 400 in FIG. 4. Accordingly, wearable 400 in FIG. 4 may, on its own, constitute and/or amount to a system for vibration-driven sensing.

Although exemplary wearable 400 includes the various components illustrated in FIG. 4, other embodiments of such wearables may omit and/or exclude one or more of those components. For example, an exemplary wearable may include vibration sensor 406 and wristband 402 but exclude processing device 408. In this example, instead of being incorporated into wearable 400, processing device 408 may be incorporated into a head-mounted display that is worn on a user's face and/or presents visual content to the user. Continuing with this example, processing device 408 incorporated into the head-mounted display may be communicatively coupled to vibration sensor 406 and/or a different processing device incorporated into wearable 400 via a wireless or wired communication interface (such as transmitter 510 in FIG. 5).

In some examples, both wearable 400 and the head-mounted display may incorporate and/or include separate processing devices. In such examples, some of the processing described in connection with sensing gestures herein may be performed by the processing device incorporated into wearable 400. Additionally or alternatively, some of the processing described in connection with sensing gestures herein may be performed by the processing device incorporated into the head-mounted display. Accordingly, any of the processing described in connection with sensing gestures may be performed at wearable 400 and/or the head-mounted display.

Figure 5:
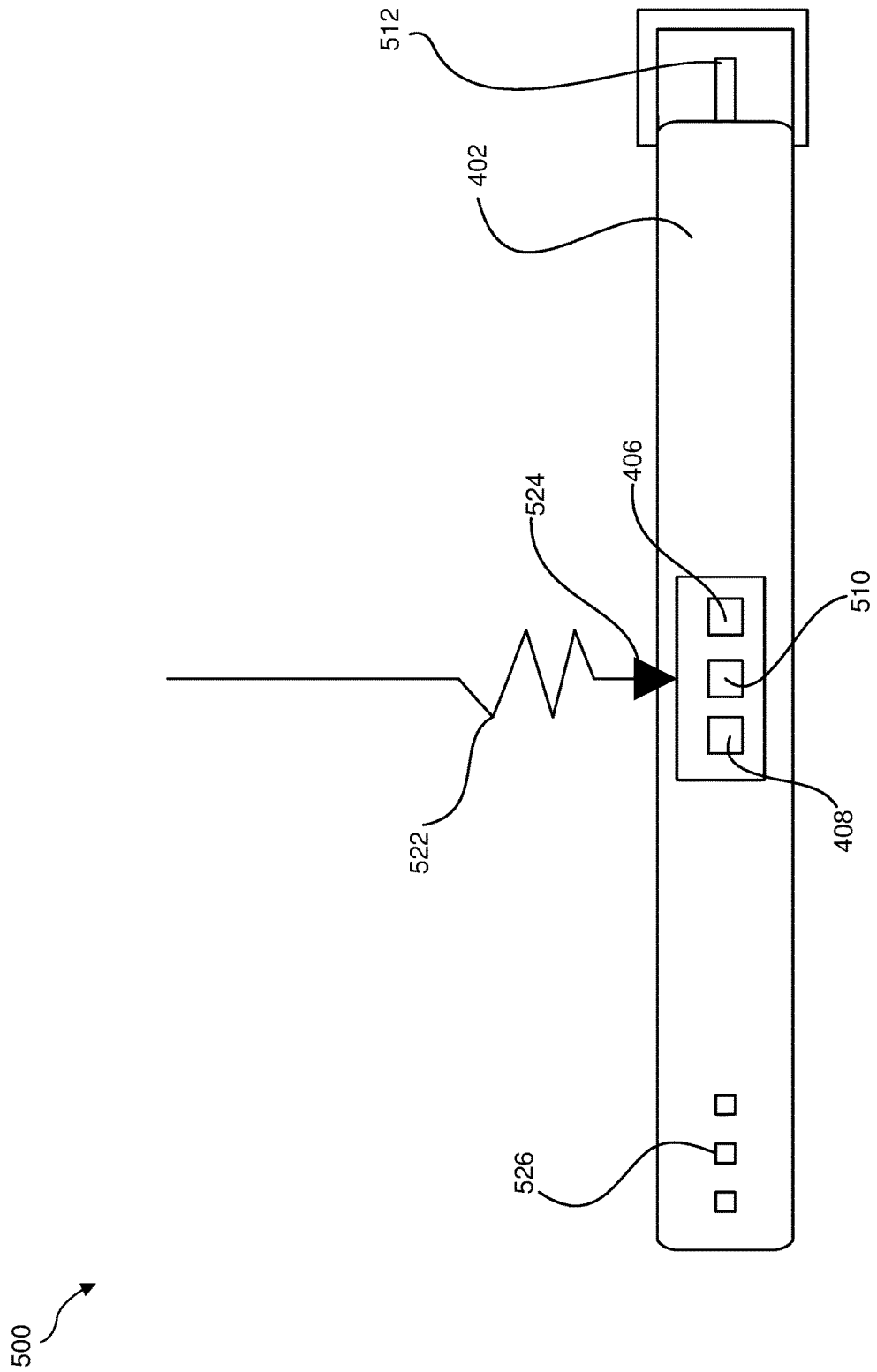
FIG. 5 depicts certain principles of operation of the exemplary wearable illustrated in FIG. 4.

FIG. 5 is an illustration of an exemplary implementation 500 that demonstrates general principles of operation of exemplary wearable 400 from FIG. 4. As illustrated in FIG. 5, exemplary wearable 400 may include vibration sensor 406, processing device 408, and wristband 402. Wearable 400 may also include a transmitter 510 capable of sending messages to a head-mounted display worn by a user who is donning wearable 400. In some examples, these messages may facilitate modifying certain virtual components (e.g., graphics and/or image frames) of the artificial reality system to account for specific gestures detected and/or sensed by wearable 400.

In some examples, vibration sensor 406 may measure and/or monitor any vibrations, acceleration, and/or changes in motion experienced by wearable 400 and/or exhibited at the user's wrist. In one example, vibration sensor 406 may measure and/or detect a vibration 522 travelling in the direction of arrow 524. When wearable 400 is donned by the user, vibration sensor 406 may be positioned and/or calibrated within wearable 400 to target vibrations originating from a specific body part of the user. For example, although not necessarily illustrated in this way in FIG. 5, vibration sensor 406 may be positioned and/or calibrated within wearable 400 to target and/or be sensitive to vibrations originating from a specific finger (e.g., a thumb, index finger, middle finger, ring finger, and/or pinky finger) on the hand of the user.

In some examples, vibration sensor 406 may be placed against the user's skin on his or her wrist to facilitate detecting vibrations propagating from the specific finger toward the wearable 400. Vibration sensor 406 may be mounted in a way that enables vibration sensor 406 to vibrate along with the user's skin and/or bone. For example, vibration sensor 406 may be positioned within wearable 400 such that vibration sensor 406 rests against the palmar side of the user's wrist. In this example, vibration sensor 406 may be mounted in a non-rigid, flexible fashion within wearable 400. This mounting may ensure that wristband 402 does not dampen the vibrations too much at the user's wrist.

In some examples, the user's body may serve as the medium through which vibrations traverse from the specific body part to wearable 400. In one example, the user's body may include organic matter capable of carrying vibrations from a specific finger to the user's wrist. For example, the skin and/or bones between the user's wrist and the specific finger may facilitate the vibrations' propagation and/or traversal.

Vibration 522 may originate from a variety of identifiable and/or discernable gestures made by the user. In some examples, vibration 522 may originate from and/or be caused by a specific gesture made by the user. In one example, vibration 522 may originate from and/or be caused by the user tapping together his or her index finger and thumb. In another example, vibration 522 may originate from and/or be caused by a hand gesture made by the user. In a further example, vibration 522 may originate and/or be caused by the user touching one body part with another body part (e.g., touching the user's left forearm with the user's right index finger). In an additional example, vibration 522 may originate and/or be caused by the user touching an inanimate object with a specific body part (e.g., touching a tabletop with the user's index finger). Accordingly, vibration 522 may represent, serve as, and/or amount to a mechanical signature of the gesture performed by the user.

In some examples, when the user's wrist is completely motionless, vibration sensor 406 may detect and/or sense little or no vibration and/or acceleration. In such examples, vibration sensor 406 may produce and/or provide a baseline reading in the absence of vibration and/or acceleration. For example, when the user's wrist is completely motionless, no meaningful vibration and/or acceleration may be caused and/or detected at wearable 400. Without detecting and/or sensing such a vibration and/or acceleration, vibration sensor 406 may produce and/or provide an output that accounts for the lack of such a vibration and/or acceleration. This output may demonstrate the absence of such a vibration and/or acceleration. Accordingly, this output produced by vibration sensor 406 may indicate and/or be used to determine that no gesture has been made by the user's hand and/or fingers on the wrist donning wearable 400.

In some examples, processing device 408 may determine that a specific body part (e.g., a finger or hand) of the user has made a certain gesture based at least in part on vibration 522. Processing device 408 may monitor the user's wrist for any meaningful vibrations and/or movements based at least in part on the output of vibration sensor 406. For example, the output of vibration sensor 406 may be commensurate with and/or represent the level of vibration, acceleration, and/or movement measured at wearable 400. In one example, one or more oscillation and/or zigzag bursts in the output of vibration sensor 406 may indicate and/or suggest that the user has made a specific gesture with his or her hand and/or fingers. Additionally or alternatively, one or more spikes and/or dampenings in the output of vibration sensor 406 may indicate and/or suggest that the user has made a specific gesture with his or her hand and/or fingers.

In some examples, processing device 408 may monitor vibration 522 for changes, variations, and deviations via the output of vibration sensor 406. In some examples, processing device 408 may determine that certain changes, variations, and/or deviations detected in the output of vibration sensor 406 are indicative of physical contact and/or a specific gesture done with a certain body part. As a specific example, processing device 408 may detect one or more oscillation and/or zigzag bursts in the output of vibration sensor 406. Processing device 408 may then determine that the oscillation and/or zigzag bursts in the output of vibration sensor 406 indicate that the user has tapped together his or her index finger and thumb. Additionally or alternatively, processing device 408 may implement and/or apply machine learning algorithms to detect and/or distinguish gesture-specific vibrations from other vibrations originating from other sources.

In some examples, the output of vibration sensor 406 may be coupled with data from other sensors to facilitate the detection of certain gestures made by the user. In one example, processing device 408 may be unable to differentiate one gesture from another based solely on the output of vibration sensor 406. To improve the accuracy of gesture detection and/or identification by wearable 400, processing device 408 may rely on telemetry data gathered from various sensors, including vibration sensor 406, aboard wearable 400 and/or incorporated elsewhere in the artificial reality system. In other words, processing device 408 may collect telemetry data from vibration sensor 406 and one or more additional sensors and then determine that the user made a specific gesture based at least in part on such telemetry data.

Examples of such sensors include, without limitation, IMUs, gyroscopes, ElectroMyoGraphy (EMG) sensors, cameras, directional acoustic sensors, combinations or variations of one or more of the same, and/or any other suitable sensors.

In response to determining that the user made a specific gesture, processing device 408 may generate an input command for the artificial reality system based at least in part on the specific gesture made by the user. In some examples, processing device 408 may facilitate modifying at least one virtual component of the artificial reality system to account for the specific gesture made by the user. Processing device 408 may facilitate such modifications in a variety of different ways and contexts. For example, processing device 408 may send a message to a head-mounted display worn by the user of the artificial reality system. Examples of this message include, without limitation, commands, computer-readable instructions, information and/or data indicative of the user making a specific gesture, combinations or variations of one or more of the same, and/or any other suitable message.

In some examples, the head-mounted display may then modify the user's artificial reality experience and/or visualization to account for the user making the specific gesture. For example, the specific gesture may signify and/or correspond to the pressing and/or selection of a button within the user's artificial reality experience. In this example, the head-mounted display may generate and/or modify certain graphics or image frames for presentation to the user. These graphics or image frames may take into account that the user has pressed and/or selected the button within the user's artificial reality experience.

As another example, the specific gesture may signify and/or correspond to the touching of a certain surface within the user's artificial reality experience. In this example, the head-mounted display may generate and/or modify certain graphics or image frames for presentation to the user. These graphics or image frames may show the user touching that surface within the user's artificial reality experience.

In other examples, processing device 408 may store the input command in connection with the artificial reality system without necessarily modifying a virtual component of the artificial reality system. For example, processing device 408 may store a tag and/or metadata for the artificial reality system in response to the specific gesture made by the user. In this example, the tag and/or metadata may not necessarily modify any virtual components of the artificial reality system.

As illustrated in FIG. 5, wearable 400 may include a fastener 512 that facilitates securing wristband 402 to the wrist of the user. In one example, fastener 512 may interface with a receptacle 526 formed by wristband 402. In this example, when wristband 402 encompasses the wrist of the user and fastener 512 is secured to receptacle 526, the combination of fastener 512 and receptacle 526 may effectively attach and/or hold wristband 402 in place on the wrist of the user. Although fastener 512 is illustrated as a specific embodiment in FIG. 5, various other embodiments of fasteners may accomplish the same objective and thus be substituted for fastener 512. Examples of such fasteners include, without limitation, members, pegs, pins, clamps, clips, latches, snaps, zippers, rivets, hook and loop combinations, combinations or variations of one or more of the same, and/or any other suitable fasteners.

In some examples, the user may don multiple wearables that work in conjunction with one another. For example, the user may don one wearable on his or her left wrist and another wearable on his or her right wrist. In this example, the wearable on the user's left wrist may detect finger taps made with the user's right hand by comparing the outputs of the vibration sensors aboard both wearables. Similarly, the wearable on the user's right wrist may detect finger taps made with the user's left hand by comparing the outputs of the vibration sensors aboard both wearables.

In another example, the user may place his or her left hand on a surface and then tap that surface with his or her right hand. In this example, the wearable on the user's left wrist may detect those finger taps made with the user's right hand by comparing the outputs of the vibration sensors aboard both wearables. Similarly, the user may place his or her right hand on a surface and then tap that surface with his or her left hand. In this example, the wearable on the user's right wrist may detect those finger taps made with the user's left hand by comparing the outputs of the vibration sensors aboard both wearables.

Figure 6:
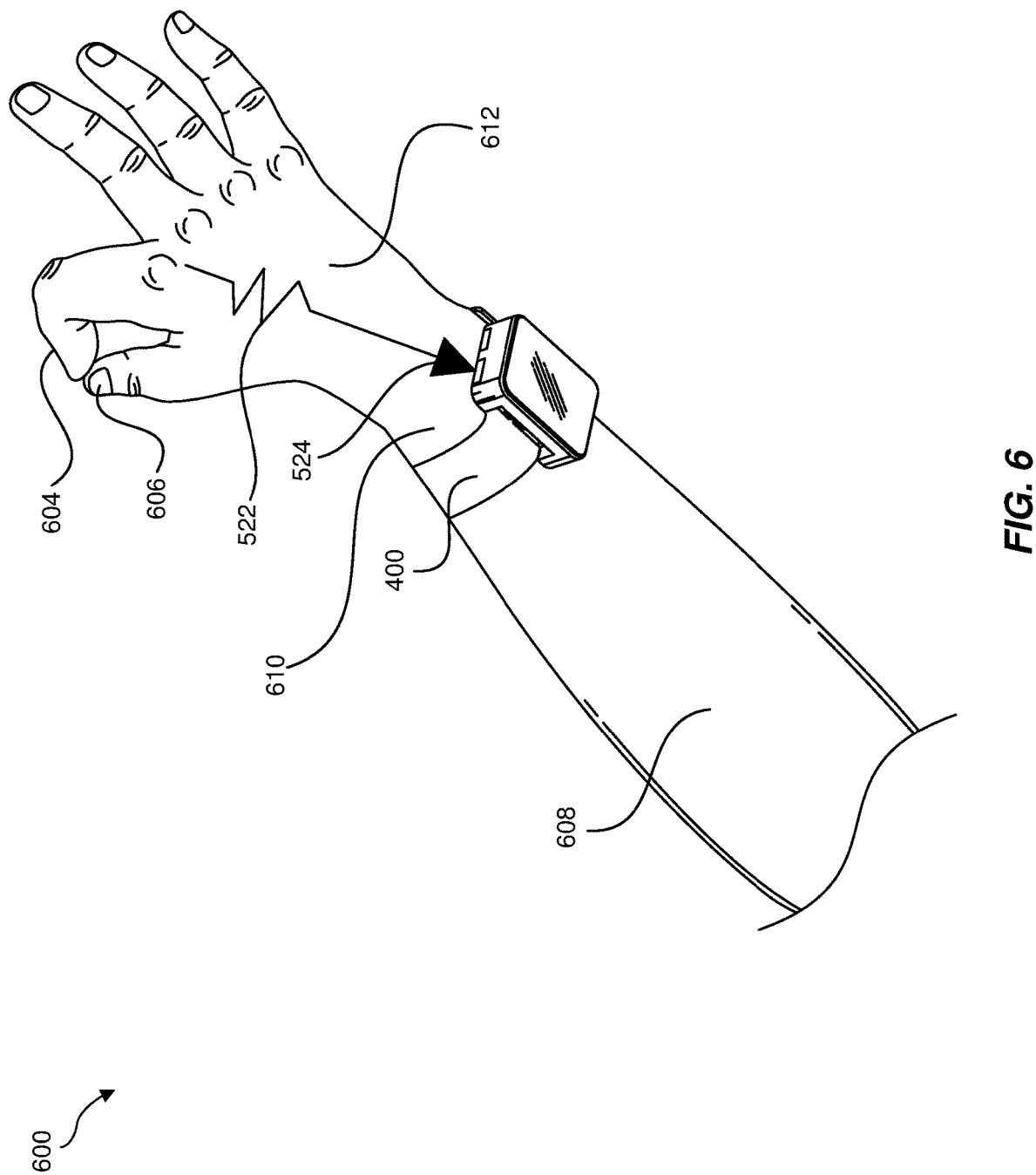
FIG. 6 is an illustration in which a user donning an exemplary wearable makes a specific gesture.

FIG. 6 is an illustration of an exemplary implementation 600 in which a user 608 donning wearable 400 taps his or her thumb 606 and index finger 604 together. As illustrated in FIG. 6, user 608 may don wearable 400 on a wrist 610 of his or her right arm. In some examples, the user may calibrate wearable 400 and/or vibration sensor 406 to that position on wrist 610. In one example, the user may perform this calibration mechanically by altering and/or moving the orientation of wearable 400 and/or vibration sensor 406. Additionally or alternatively, wearable 400 may perform a form of self-calibration by way of automated electrical and/or mechanical processes designed to customize, tailor, and/or personalize vibration sensor 406 to the individual user.

As illustrated in FIG. 6, the tapping of thumb 606 and index finger 604 may generate and/or produce vibration 522. In this example, vibration 522 may traverse from thumb 606 and/or index finger 604 toward wrist 610 via body 612 of user 608. Body 612 may include and/or represent a skin surface and/or bone structure of user 608.

In some examples, vibration sensor 406 may be positioned within wearable 400 such that vibration sensor 406 presses against and/or touches the skin and/or bone of user 608. Additionally or alternatively, vibration sensor 406 may be positioned within wearable 400 such that a certain surface of the vibration sensor's package is aimed at and/or steered toward thumb 606 and/or index finger 604. In one example, vibration sensor 406 may be positioned proximate to and/or interface directly with the skin surface of the user within wristband 402.

In some examples, vibration sensor 406 may produce one or more outputs that are commensurate to its vibration and/or acceleration reading at any given time. Accordingly, the outputs produced by vibration sensor 406 may indicate when user 608 makes a certain gesture based on one or more vibrations, changes, and/or accelerations exhibited. For example, measurements taken by vibration sensor 406 may indicate and/or exhibit certain changes in the vibration and/or acceleration levels at the user's wrist based on gestures made by the user. In one example, an oscillating and/or zigzagging burst in the acceleration reading may indicate and/or suggest that the user has made a specific gesture with his or her hand and/or fingers. Additionally or alternatively, a spike and/or dampening in the acceleration reading may indicate and/or suggest that the user has made a specific gesture with his or her hand and/or fingers. The meaning and/or significance of these indicators (e.g., oscillating and/or zigzagging bursts) with respect to the user's gestures may vary depending on the configuration and/or design of vibration sensor 406.

Figure 7:
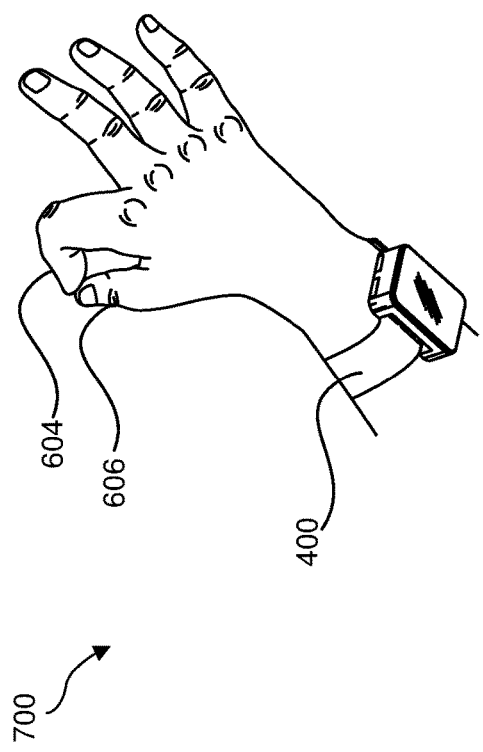
FIG. 7 is an additional illustration in which a user donning an exemplary wearable makes a specific gesture.
Figure 8:
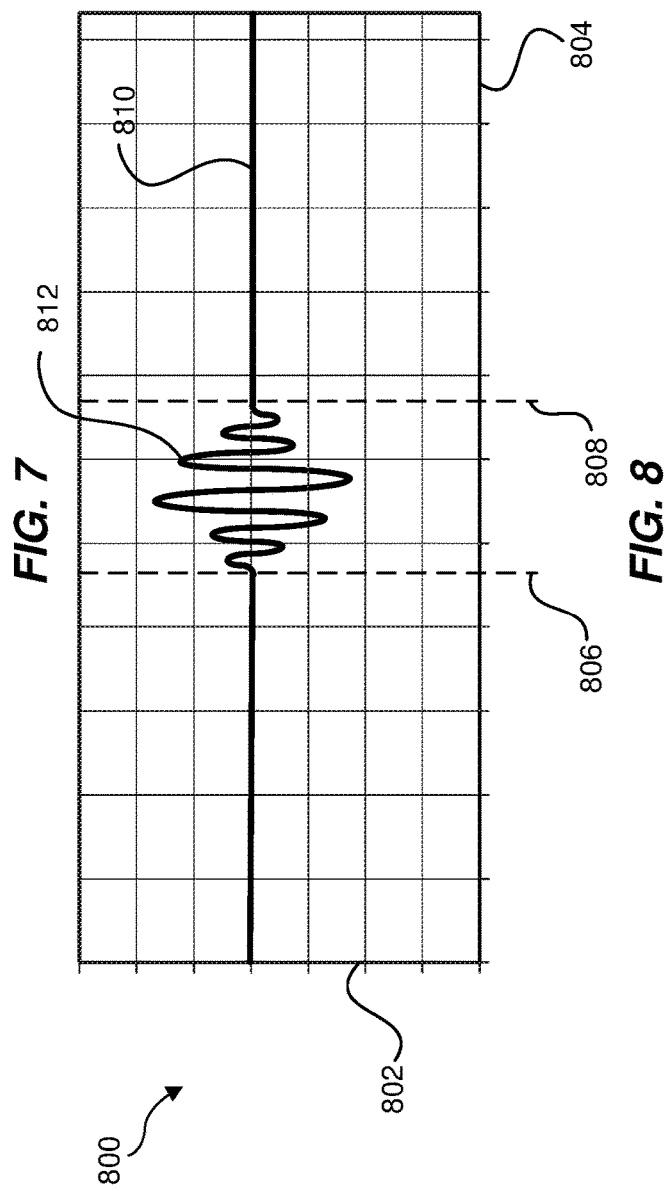
FIG. 8 is an illustration of an exemplary electrical response generated by a vibration sensor incorporated into a wearable donned by a user of an artificial reality system.

FIG. 7 is an illustration of a user performing an exemplary tapping 700 while donning wearable 400, and FIG. 8 is an illustration of an exemplary representation 800 of an electrical response 810 produced by vibration sensor 406 as the user performs tapping 700 depicted in FIG. 7. As illustrated in FIG. 7, the user may tap thumb 606 and index finger 604 together. In one example, vibration 522 may result from and/or be caused by tapping 700. In this example, vibration 522 may traverse from the source of tapping 700 toward the user's wrist via the user's skin and/or bone.

As illustrated in FIG. 8, exemplary representation 800 may depict electrical response 810 that overlays a reference graph consisting of an x-axis 804 and a y-axis 802. In one example, x-axis 804 may correspond to and/or represent time. In this example, y-axis 802 may correspond to and/or represent voltage. Accordingly, electrical response 810 may constitute a voltage level that is commensurate to the measurement of acceleration and/or vibration taken by vibration sensor 406 over a certain period of time.

As illustrated in FIG. 8, exemplary representation 800 may also include a time marker 806 that marks and/or identifies the point in time at which the user illustrated in FIG. 7 makes physical contact between thumb 606 and index finger 604. As the user makes physical contact between thumb 606 and index finger 604, electrical response 810 may experience and/or exhibit an oscillation burst 812. Accordingly, oscillation burst 812 may indicate and/or be used to determine that the user has made physical contact with thumb 606 and index finger 604 at the point in time represented by time marker 806.

In addition, exemplary representation 800 may include a time marker 808 that marks and/or identifies the point in time at which oscillation burst 812 subsides. As a result of oscillation burst 812 subsiding, electrical response 810 may return to normal. This normal reading may indicate a lack and/or absence of gestures made by the user and/or acceleration experienced by wearable 400.

In some examples, processing device 408 may monitor vibrations and/or acceleration experienced and/or exhibited at wearable 400 based at least in part on the output of vibration sensor 406. For example, the output of vibration sensor 406 may be commensurate with and/or represent the vibration and/or acceleration levels measured at wearable 400. In this example, processing device 408 may monitor the user's wrist for vibrations and/or acceleration via the output of vibration sensor 406.

In some examples, wearable 400 and/or the head-mounted display may implement one or more machine learning algorithms and/or models to facilitate the detection, identification, and/or classification of certain gestures made by the user. For example, wearable 400 and/or the head-mounted display may be programmed and/or configured with a fully and/or partially constructed machine learning model (such as a convolutional neural network and/or a recurrent neural network). In one example, wearable 400 and/or the head-mounted display may include and/or incorporate a storage device that stores the machine learning model. The machine learning model may be trained and/or constructed with training data that includes various samples of electrical responses generated by vibration sensors.

Some of these samples may represent and/or be indicative of certain user gestures. These samples may constitute positive data for the purpose of training the machine learning model. Other samples may represent and/or be indicative of non-gestures. These other samples may constitute negative data for the purpose of training the machine learning model.

In some examples, one or more of these samples may be supplied by a pool of indiscriminate users whose data is collected by the manufacturer of wearable 400 for the purpose of training the machine learning model. In one example, one or more of these samples may also be supplied by the end user donning wearable 400 and/or operating the artificial reality system. For example, the user may calibrate and/or train the machine learning model implemented on wearable 400 to recognize his or her rendition of a specific gesture (because one person's rendition of the gesture may cause a different vibration signature and/or profile than another's). To do so, the user may perform one or more instances of the specific gesture, thereby causing vibration sensor 406 to generate one or more electrical responses. These electrical responses may represent and/or serve as samples of the user's rendition of the specific gesture.

Continuing with this example, processing device 408 may capture those samples of the electrical responses generated by vibration sensor 406 while the user performs the specific gesture. Processing device 406 may then calibrate the machine learning model to recognize the specific gesture as performed by the user.

Upon training and/or calibrating the machine learning model, processing device 408 may be able to classify electrical responses generated by vibration sensor 406 as gestures or non-gestures via the machine learning model. In other words, the machine learning model may indicate and/or determine whether any vibrations detected at wearable 400 are meant by the user to communicate a gesture-based command and/or instruction to the artificial reality system. In one example, processing device 408 may receive an electrical response from vibration sensor 406. In this example, processing device 408 may analyze, classify, and/or process the electrical response via the machine learning model.

In some examples, processing device 408 may detect, via the machine learning model, a pattern indicative of the specific gesture within the electrical response. In such examples, processing device 408 may then determine that the user has made a specific gesture based at least in part on the pattern detected via the machine learning model.

As a specific example, the machine learning model may represent a convolutional neural network that includes various layers, such as one or more convolution layers, activation layers, pooling layers, and fully connected layers. In this example, the electrical response may include and/or represent the most recent 100 milliseconds of x-, y-, and z-axis data outputted by vibration sensor 406. Processing device 408 may pass the electrical response through the convolutional neural network to classify the electrical response as a specific gesture or a non-gesture.

In the convolutional neural network, the electrical response may first encounter the convolution layer. At the convolution layer, the 100 milliseconds of data in the electrical response may be convolved using a filter and/or kernel. In particular, the convolution layer may cause processing device 408 to slide a matrix function window over and/or across the 100 milliseconds of data in the electrical response. Processing device 408 may then record the resulting data convolved by the filter and/or kernel. In one example, one or more nodes included in the filter and/or kernel may be weighted by a certain magnitude and/or value.

After completion of the convolution layer, the convolved representation of the electrical response may encounter the activation layer. At the activation layer, the convolved data in the electrical response may be subjected to a non-linear activation function. In one example, the activation layer may cause processing device 408 to apply the non-linear activation function to the convolved data in the electrical response. By doing so, processing device 408 may be able to identify and/or learn certain non-linear patterns, correlations, and/or relationships between different regions of the convolved data in the electrical response.

In some examples, processing device 408 may apply one or more of these layers included in the convolutional neural network to the electrical response multiple times. As the electrical response completes all the layers, the convolutional neural network may render a classification for the electrical response. In one example, the classification may indicate that the electrical response is indicative of a known gesture made by the user. In another example, the classification may indicate that the electrical response is not indicative of a known gesture made by the user.

In other examples, wearable 400 may maintain a set of signatures that represent vibration and/or acceleration profiles of different body parts tapping together. In one example, each signature may amount to a digital representation of an electrical profile that is indicative of a specific gesture. For example, one signature may define an output formation of vibration sensor 406 that is indicative of the user tapping together his or her thumb and index finger. This signature may include and/or amount to electrical data that represents and/or corresponds to an oscillation burst exhibited in the output of vibration sensor 406, as illustrated in FIG. 8. In this example, another signature may define another output formation of vibration sensor 406 that is indicative of the user tapping his or her right index finger against his or her left forearm.

These output formations defined by the signatures may differ from one another and thus represent different gestures made by the user. As a result, processing device 408 may be able to distinguish such gestures from one another based at least in part on these signatures. In some examples, these signatures may each define an acceptable range of data points and/or an acceptable pattern of data points in the output of vibration sensor 406.

Processing device 408 may compare the output of vibration sensor 406 to the set of signatures maintained by wearable 400. More specifically, this comparison may involve electrical response 810 in FIG. 8. In one example, processing device 408 may determine that electrical response 810 matches the signature that represents the vibration and/or acceleration profile of the user tapping together his or her thumb and index finger. Alternatively, processing device 408 may determine that electrical response 810 matches the other signature that represents the vibration and/or acceleration profile of the user tapping his or her right index finger against his or her left forearm.

In one example, processing device 408 may compare one or more points of electrical response 810 generated by vibration sensor 406 to one or more acceptable value ranges defined by a signature. In this example, processing device 408 may determine that the points of electrical response 810 fall within the acceptable value ranges defined by the signature. Processing device 408 may then determine that electrical response 810 matches the signature due at least in part to the points of electrical response 810 falling within those acceptable value ranges.

In some examples, processing device 408 may measure electrical response 810 generated by vibration sensor 406. In one example, processing device 408 may measure electrical response 810 via analog-to-digital conversion. In another example, processing device 408 may measure electrical response 810 by receiving digital data that represents electrical response 810 from vibration sensor 406 via a serial communication bus. Either way, processing device 408 may determine that the measurement of electrical response 810 is indicative of a specific gesture (such as finger-to-thumb tapping, a hand gesture, wrist twisting, touching one body part with another, and/or touching an inanimate object with a specific body part).

In some examples, exemplary representation 800 in FIG. 8 may correspond to a single degree of freedom. For example, exemplary representation 800 in FIG. 8 may correspond to a reading of the acceleration level in the x-direction. However, vibration sensor 406 may also measure other degrees of freedom and generate readings of the same. For example, vibration sensor 406 may measure the acceleration levels experienced in the y-direction and/or z-direction in addition to the x-direction. Accordingly, vibration sensor 406 may also generate readings of the acceleration levels measured in the y-direction and/or z-direction. Processing device 408 may analyze and/or consider acceleration readings from all degrees of freedom measured by vibration sensor 406 when determining whether the user has made a specific gesture.

Figure 9:
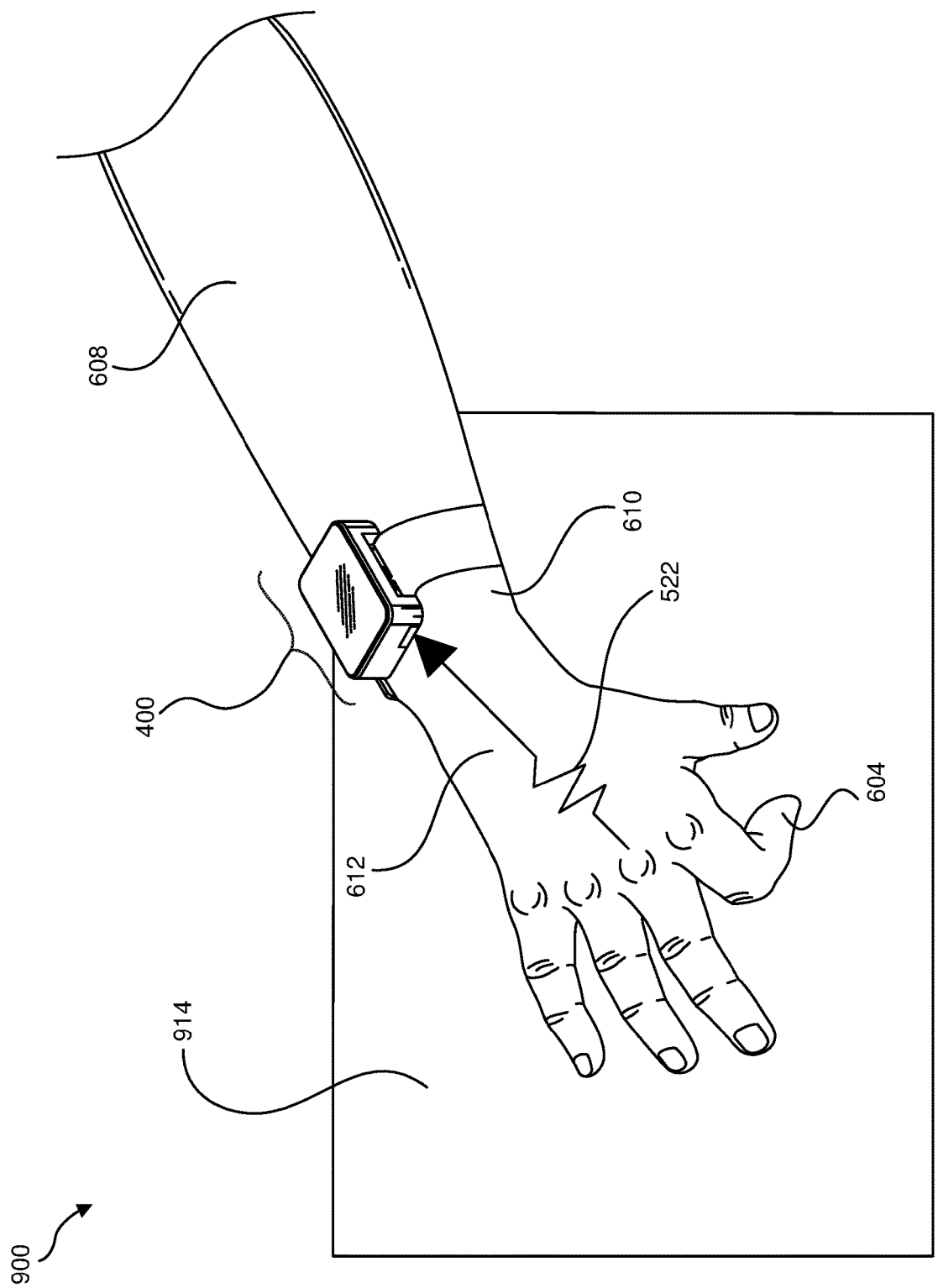
FIG. 9 is a further illustration in which a user donning an exemplary wearable makes a specific gesture.

FIG. 9 is an illustration of an exemplary implementation 600 in which user 608 donning wearable 400 makes physical contact with an object 514. As illustrated in FIG. 9, user 608 may don wearable 400 on a wrist 610 of his or her right arm. In some examples, user 608 may touch and/or tap object 914 with index finger 604. Examples of object 914 include, without limitation, a wall, a table, a counter, a ball, a pad, combinations of one or more of the same, and/or any other suitable object.

By touching and/or taping object 914 in this way, user 608 may generate and/or produce vibration 522. In one example, vibration 522 may traverse from index finger 604 to wearable 400 via the user's skin and/or bone. As vibration 522 arrives at wearable 400, vibration sensor 406 may detect and/or sense vibration 522 and/or the acceleration resulting from vibration 522. In response to detecting and/or sensing vibration 522 and/or the corresponding acceleration, vibration sensor 406 may output an electrical representation of vibration 522 and then deliver the same to processing device 408.

Upon receiving the electrical representation of vibration 522, processing device 408 may determine that the electrical representation of vibration 522 is indicative of the user having touched and/or tapped an inanimate object, such as object 914. In response, processing device 408 may facilitate modifying certain virtual components (e.g., graphics and/or image frames) of the artificial reality system to account for the touching and/or tapping detected and/or sensed at wearable 400.

Figure 10:
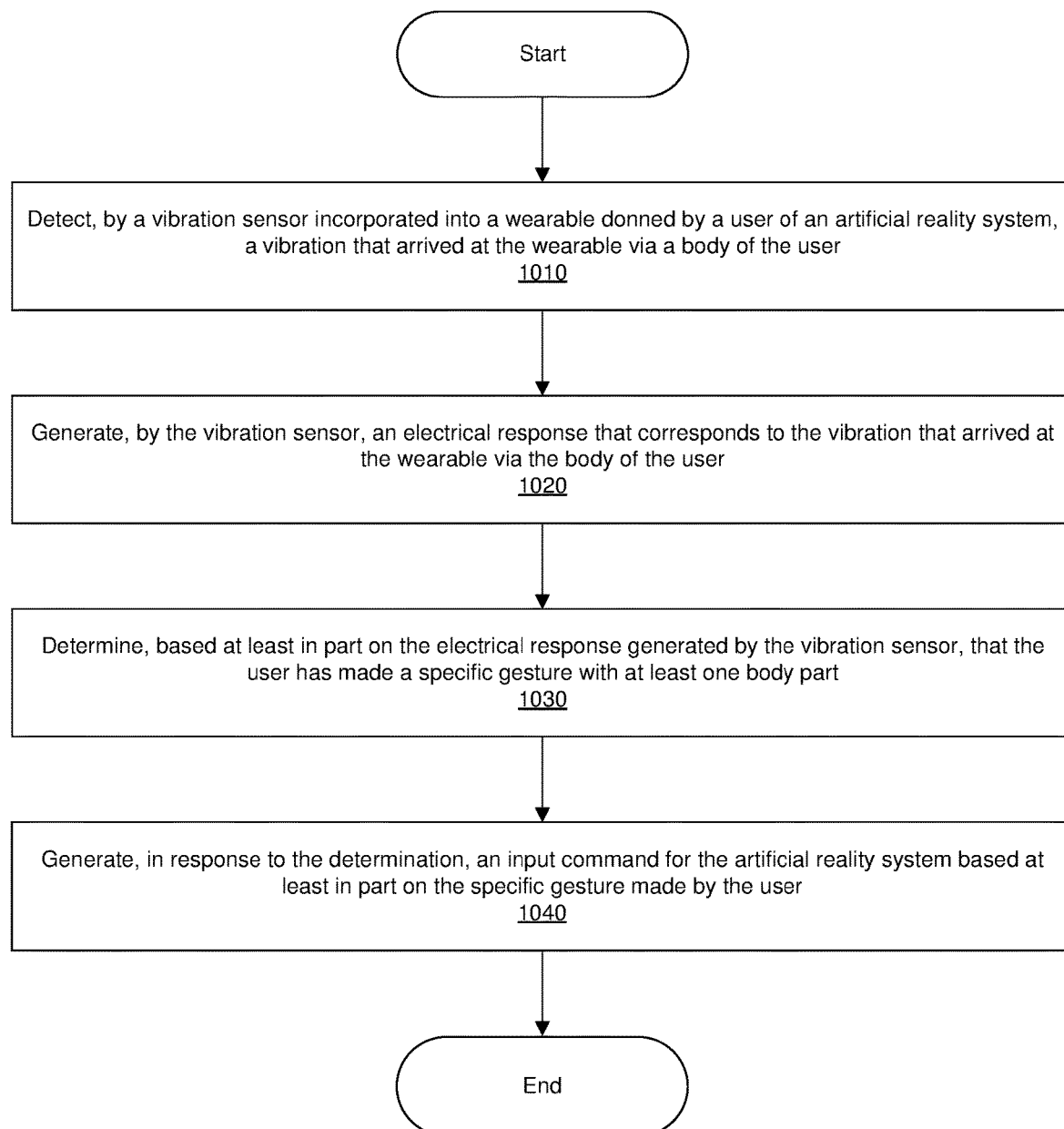
FIG. 10 is a flow diagram of an exemplary method for sensing gestures via vibration-sensitive wearables donned by users of artificial reality systems.

FIG. 10 is a flow diagram of an exemplary method 1000 for sensing gestures via vibration-sensitive wearables donned by users of artificial reality systems. The steps shown in FIG. 10 may be performed by certain devices incorporated into a wearable of an artificial reality system. Moreover, the steps shown in FIG. 10 may also incorporate and/or involve various sub-steps and/or variations consistent with the descriptions provided above in connection with FIGS. 1-9.

As illustrated in FIG. 10, at step 1010, a vibration sensor incorporated into a wearable donned by a user of an artificial reality system may detect a vibration that arrived at the wearable via a body (e.g., a skin surface and/or bone structure) of the user. For example, wrist 610 of user 608 may experience vibration 522 that arrived via the skin and/or bone of user 608. Since, in this example, user 608 is donning wearable 400 around wrist 610, vibration sensor 406 incorporated into wearable 400 may measure, detect, and/or sense the acceleration caused by vibration 522.

At step 1020 in FIG. 10, the vibration sensor may generate an electrical response that corresponds to the vibration that arrived at the wearable via the body of the user. For example, vibration sensor 406 may measure vibration 522 from various all degrees of freedom. In this example, vibration sensor 406 may generate an electrical response that is commensurate with and/or representative of vibration 522.

At step 1030 in FIG. 10, a processing device may determine that the user has made a specific gesture with at least one body part based at least in part on the electrical response generated by the vibration sensor. For example, processing device 408 and/or a processing device incorporated into a head-mounted display of the artificial reality system may determine that user 608 has made a specific gesture with his or her hand or fingers. In this example, processing device 408 and/or the processing device incorporated into the head-mounted display may reach this determination based at least in part on the electrical response generated by vibration sensor 406.

At step 1040 in FIG. 10, a processing device may generate an input command for the artificial reality system based at least in part on the specific gesture made by the user. For example, processing device 408 and/or the processing device incorporated into the head-mounted display may modify one or more graphics included in image frames presented to the user via the head-mounted display. Such modifications to those graphics may account for the specific gesture made by the user's hand and/or fingers.

As described above in connection with FIGS. 4-10, a wearable device in the form of a wristband may be incorporated into an artificial reality system. This wearable device may be able to detect certain gestures made by a user of the artificial reality system. For example, the wearable device may constitute a wristband that includes a vibration sensor. When the user makes a certain gesture with his or her hand and/or fingers (e.g., tapping together his or her thumb and index finger), the vibration sensor may detect and/or sense a vibration resulting from that gesture. The vibration sensor may then generate an electrical response consistent with that vibration. The wearable device may be able to identify which particular gesture was made by the user by analyzing the electrical response generated by the vibration sensor. Upon identifying the particular gesture, the wearable device may cause the artificial reality system to modify the user's artificial reality experience to account for that gesture.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    a wearable dimensioned to be donned by a user of an artificial reality system;
    a vibration sensor incorporated into the wearable, wherein the vibration sensor generates an electrical response that corresponds to a vibration detected at the wearable; and
    at least one processing device communicatively coupled to the vibration sensor, wherein the processing device:
        processes the electrical response via a machine learning model trained with training data that includes:
            one or more samples representative of the user making a specific gesture with at least one body part; and
            one or more additional samples representative of the user not making the specific gesture with the body part;
        determines, based at least in part on the electrical response processed via the machine learning model, that the user has made the specific gesture with the body part; and
        in response to determining that the user has made the specific gesture with the body part, generates an input command for the artificial reality system based at least in part on the specific gesture made by the user.

2. The system of claim 1, wherein the processing device:
    detects, via the machine learning model, a pattern indicative of the specific gesture within the electrical response; and
    determines, based at least in part on the pattern detected via the machine learning model, that the user has made the specific gesture with the body part.

3. The system of claim 2, further comprising a storage device that stores the machine learning model, wherein the machine learning model comprises at least one of:
    a convolutional neural network; or
    a recurrent neural network.

4. The system of claim 2, wherein processing device:
    captures at least one of the samples from electrical responses generated by the vibration sensor while the user performs the specific gesture; and
    calibrates, based at least in part on the at least one of the samples, the machine learning model to recognize the specific gesture as performed by the user.

5. The system of claim 1, wherein the processing device is incorporated into at least one of:
    the wearable; or
    a head-mounted display that is communicatively coupled to the wearable.

6. The system of claim 1, wherein the wearable comprises a wristband dimensioned to be donned on a wrist of the user.

7. The system of claim 1, wherein the processing device:
    measures the electrical response generated by the vibration sensor; and
    determines that the measurement of the electrical response is indicative of the specific gesture made by the user, wherein the specific gesture comprises at least one of:
        a tapping together of an index finger of the user and a thumb of the user;
        a tapping together of a middle finger of the user and a thumb of the user;
        a hand gesture;

a wrist twist;
a physical touching of the body part to another body part; or
a physical touching of the body part to an inanimate object.

8. The system of claim 1, wherein the vibration sensor generates the electrical response by measuring an amount of acceleration caused by the vibration, the vibration having propagated from the body part to the wearable via the body of the user.

9. The system of claim 1, wherein the vibration sensor is positioned proximate to a skin surface of the user within the wearable.

10. The system of claim 1, further comprising:
a transmitter that is incorporated into the wearable;
a head-mounted display dimensioned to be donned on a head of the user; and
wherein the processing device:
  is incorporated into the wearable; and
  sends the input command for the artificial reality system to the head-mounted display via the transmitter, wherein the input command causes the head-mounted display to account for the specific gesture made by the user.

11. The system of claim 1, wherein the vibration sensor has an output data rate of at least 200 hertz.

12. The system of claim 1, wherein the electrical response generated by the vibration sensor is commensurate with the vibration detected at the wearable.

13. The system of claim 1, wherein the processing device facilitates modifying at least one virtual component of the artificial reality system to account for the specific gesture made by the user.

14. A wearable comprising:
a fastener dimensioned to facilitate securing the wearable to a user of an artificial reality system;
a vibration sensor that generates an electrical response that corresponds to a vibration detected at the wearable; and
at least one processing device communicatively coupled to the vibration sensor, wherein the processing device:
  processes the electrical response via a machine learning model trained with training data that includes:
    one or more samples representative of the user making a specific gesture with at least one body part; and
    one or more additional samples representative of the user not making the specific gesture with the body part;
  determines, based at least in part on the electrical response processed via the machine learning model, that the user has made the specific gesture with the body part; and
  in response to determining that the user has made the specific gesture with the body part, generates an input command for the artificial reality system based at least in part on the specific gesture made by the user.

15. The wearable of claim 14, wherein the processing device:
detects, via the machine learning model, a pattern indicative of the specific gesture within the electrical response; and
determines, based at least in part on the pattern detected via the machine learning model, that the user has made the specific gesture with the body part.

16. The wearable of claim 15, further comprising a storage device that stores the machine learning model, wherein the machine learning model comprises at least one of:
a convolutional neural network; or
a recurrent neural network.

17. The wearable of claim 15, wherein processing device:
captures at least one of the samples from electrical responses generated by the vibration sensor while the user performs the specific gesture; and
calibrates, based at least in part on the at least one of the samples, the machine learning model to recognize the specific gesture as performed by the user.

18. The wearable of claim 14, wherein the processing device is incorporated into at least one of:
the wearable; or
a head-mounted display that is communicatively coupled to the wearable.

19. The wearable of claim 14, further comprising a wristband dimensioned to be donned on a wrist of the user, wherein the fastener facilitates securing the wristband to the wrist of the user.

20. A method comprising:
detecting, by a vibration sensor incorporated into a wearable donned by a user of an artificial reality system, a vibration that arrived at the wearable via a body of the user;
generating, by the vibration sensor, an electrical response that is corresponds to the vibration that arrived at the wearable via the body of the user;
processing the electrical response via a machine learning model trained with training data that includes:
  one or more samples representative of the user making a specific gesture with at least one body part; and
  one or more additional samples representative of the user not making the specific gesture with the body part;
determining, based at least in part on the electrical response processed via the machine learning model, that the user has made the specific gesture with the body part; and
in response to determining that the user has made the specific gesture with the body part, generating an input command for the artificial reality system based at least in part on the specific gesture made by the user.

* * * * *